Sept. 12, 1944. W. G. HOELSCHER 2,357,952
FLUID OPERATED GEAR SHIFTING MECHANISM
Original Filed July 18, 1940
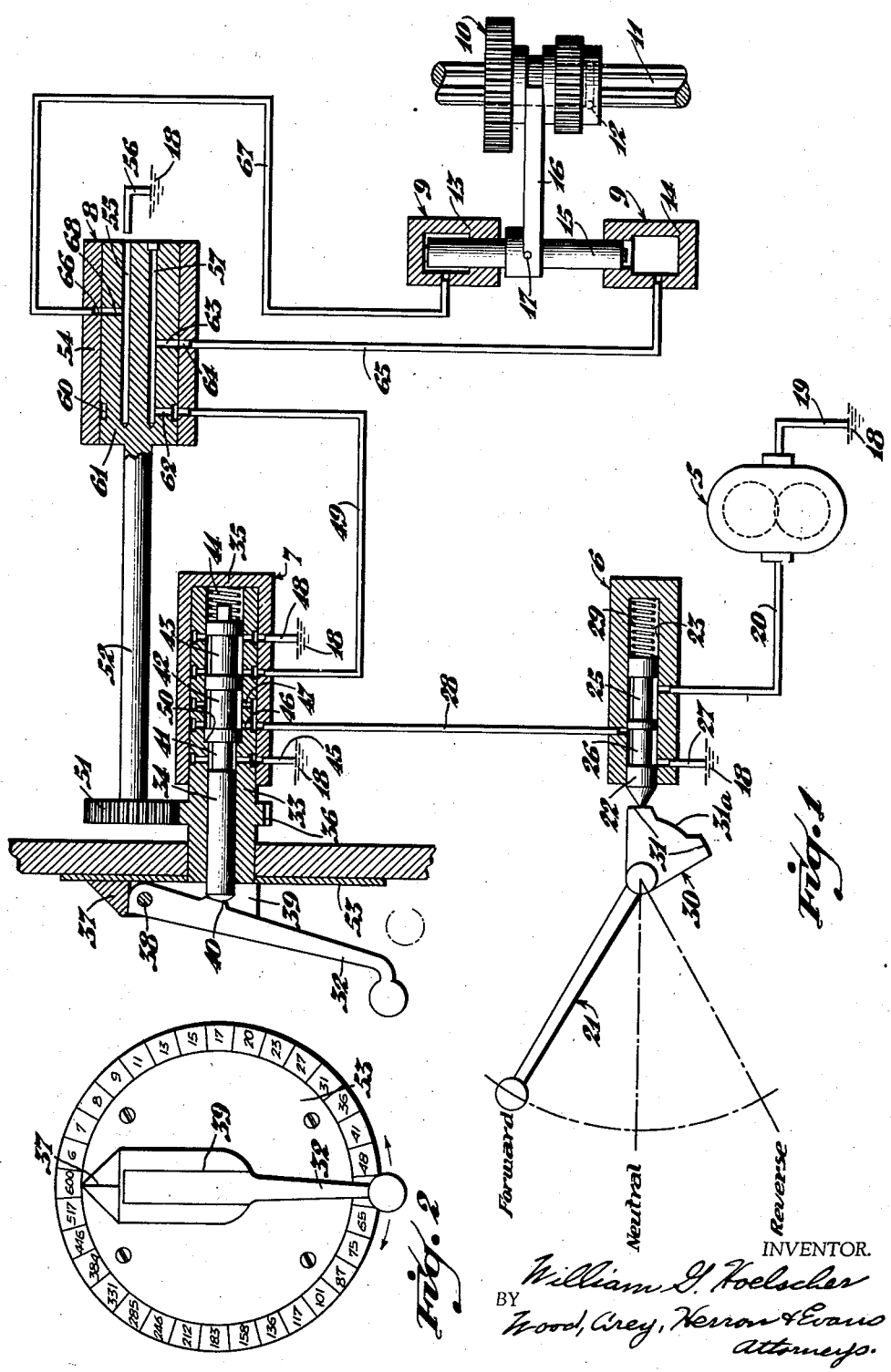
INVENTOR.
William G. Hoelscher
BY Wood, Airey, Herron & Evans
Attorneys.

Patented Sept. 12, 1944

2,357,952

UNITED STATES PATENT OFFICE 2,357,952

FLUID OPERATED GEAR SHIFTING MECHANISM

William G. Hoelscher, Cincinnati, Ohio, assignor to The American Tool Works Company, Cincinnati, Ohio, a corporation of Ohio Original application July 18, 1940, Serial No. 346,185. Divided and this application August 22, 1942, Serial No. 455,761

7 Claims. (Cl. 192—3.5)

This invention relates to fluid operated gear shifting or speed changing mechanism. More particularly, it is directed to a system or circuit arrangement wherein the operations of pre-selection and shifting are coordinated with the operating means for the clutch which controls the power connection to the transmission.

It is highly desirable that the operator be able to pre-select the speed, to which he intends to shift, while the transmission is being driven. A system should be so arranged that the operator may select the next speed regardless of the fact that the transmission is in operation. Further, it should be arranged so that the operator cannot change gears while the transmission is coupled to the power source. Also, when the clutch lever is in neutral, it is desirable to hold the shifting valve in place by power after it has been set manually so that there will be ample time in which the shift may take place.

Therefore, it has been the object of the present inventor to provide a system and arrangement of control elements which will produce the above results; that is, will permit the operator to pre-select while the power is coupled to the transmission, which will permit the actual shift to be made only when the power is disconnected, and which will hold the shift control valve in shifting position when the power is uncoupled so that all the operator need do is to move the valve to shift position, whereupon it will be held in shift position hydraulically until the power which drives the transmission is again connected.

More particularly, it has been the object of the present inventor to provide a combination of valves, one of which controls the application of hydraulic pressure from the source to shifting and selector valves, and the others of which are operable through a single lever for pre-selection and subsequent shift when the first valve is opened following uncoupling of the power, and wherein the shifting valve will be held in shifting position when the control valve is open so as to insure the completion of the shift.

The structure bringing about this result resides in the combination of a control valve which permits the application of hydraulic pressure to the shifting valve in such a way as to hold it in shifting position when the control valve is open. In this improved structure, the shifting valve must be operated manually, as an operation separate and apart from the operation of setting the selector valve. A lever having a rotating and a depressive movement is utilized, the rotation being effective for speed selection and the depressive movement being for the purpose of shifting the shifter valve plunger to shifting position. If the control valve is closed, as when the power is coupled, the depressive movement is idle and accomplishes nothing; but if the valve is open, the depressive movement will bring about the shift and the oil under pressure will hold the shifting valve plunger in shifting position.

The subject matter set forth and described in this application is divisional of application Serial No. 346,185 filed July 18, 1940, which matured on March 9, 1943, as Patent No. 2,213,438.

Other objects and certain advantages will be more fully apparent from a description of the drawing in which:

Figure 1 is a diagrammatic view showing the circuit with the elements of the circuit shown in section for illustrating the circulation through the various valves.

Figure 2 is a face view of the selector dial means and gear shift control means.

Referring to the drawing, the gear shifting system includes an oil pump 5, a shut-off valve 6, a shifting valve 7, a selector valve 8, and gear shifting cylinders 9. The valves are in the circuit in the order named. The shifting power is represented by the oil pressure delivered by the pump to the shifting cylinders. Therefore, with the shut off valve closed, the gear shifting system is ineffective.

Although only one gear shifting unit and one gear cluster are illustrated, it is obvious that a plurality may be used. The gear cluster to be shifted is indicated at 10 and is slidably mounted on a splined shaft 11. To retain the cluster in engaged or disengaged positions, the splined shaft is provided with detent means shown in dotted lines at 12. The gear shifting unit comprises two cylinders 13 and 14, one at each end of a plunger 15. A yoke 16, engaging a groove in the gear cluster, is pinned to the plunger at 17. Thus, to move the cluster for a desired shift, one cylinder is charged as the other one is exhausted.

The pump 5 draws oil from a sump, indicated at 18, through an intake line 19, and delivers it under pressure through a line 20 to the shut-off valve 6. The shut-off valve is open only when the lever 21, which controls the forward and reverse clutches (not shown) of the drive means to the transmission, is in neutral. Consequently, oil pressure is permitted to pass through the shut-off valve to the other valves in the circuit to effect a shift only when the gears in the transmission are entirely disconnected from the drive means.

The shut-off valve comprises a plunger 22 which slides in a cylinder 23 in a casing 24. The plunger included two grooves. When the valve is closed, one of the grooves 25 is in communication with the pressure line 20 from the pump. At this time, the other groove 26 is in communication with the sump through an exhaust line 27, and the shifting valve 7, through a line 28. The plunger is under the influence of a coil spring 29 which tends to move the plunger to connect the lines 20, 28 through groove 25.

The end of the plunger opposite the coil spring is tapered and extends from the casing 24 to contact the face of a cam 30 which is fixed to the shaft of the control lever 21. When the control lever is in forward or reverse positions, the high sections 31 of the cam face contact the plunger, thus forcing the plunger back into the casing against the pressure of the coil spring for closing the valve. When the control lever is in neutral, the low section 31a of the cam face contacts the plunger, thus permitting the spring to force the plunger outwardly to open the valve.

The shifting valve 7 is controlled by a selector handle 32. It is effective only when the shut-off valve connects lines 20 and 28. The shifting valve comprises a body 33 in which a plunger 34 slides, and a casing 35 in which the body 33 is rotatively journalled. The body extends from the housing and includes a gear 36 and a pointer element 37 both of which are formed integrally with or fixed to the body and rotate with it. The selector handle 32 is pivoted on a pin 38 in a slot 39 in the pointer element. The pivot point is to one side of the center of rotation adjacent the indicator point of the pointer element, while the handle extends diametrically across the axis of rotation of the valve.

The selector handle 32 has two distinct movements. When it is rotated, it sets up the selector valve 8 to make certain shifts. When pushed in, it actuates the plunger of the shifting valve for causing the shifts by permitting passage of the fluid to the selector valve. One end of the plunger 34 extends from the casing into the slot in the pointer element and is contacted by a boss 40 on the underside of the handle 32.

The plunger 34 has two sections of different diameters. The smaller diameter is provided with an annular groove 41. The larger diameter is provided with two annular grooves 42 and 43. A coil spring 44 under compression, between the inner end of the plunger and the end of the casing bore, tends to hold the plunger 34 out against the selector handle. When in this position, the groove 41 in the smaller diameter section of the plunger is in communication with the sump 18 through an exhaust line 45. The groove 42 in the larger diameter section is in communication with the line 28 from the shut-off valve through two ports 46 and 47. The groove 43 is in communication with the sump through an exhaust line 48 and with the speed selector valve through a pressure line 49. When the plunger 34 is in its second position, i. e., when the selector handle has been pushed in, the exhaust line 45 is closed, line 28 is open to groove 41 through port 46 and to line 49 through port 47, and the exhaust line 48 is closed. The operation of this valve, in relation to the circuit, will be discussed below.

As stated above, the plunger 34 of the shifting valve 7 has two different diameters. The differential exists just beyond the groove 41. When the plunger is in its out position, the shoulder 50 between the portions of different diameter abuts a shoulder in the body 33. When the selector handle is pushed in, the shoulder 50 on the plunger is moved between the two ports 46 and 47. Thus, with the shut-off valve open, oil pressure is admitted to groove 41 through port 46. At this time, the exhaust line 45 has been closed and groove 42 has been moved to include port 47 and the opening to line 49. Due to the difference in areas, as provided by the shoulder at 50, the oil pressure overcomes the spring pressure and holds the plunger in.

When the selector handle is pushed in with the shut-off valve closed, no pressure exists in groove 41. Under these circumstances, the coil spring 44 returns the plunger and handle to their out positions just as soon as the operator releases the handle.

The gear 36 meshes with a gear 51 keyed to the end of a shaft 52. The speed selector valve includes a rotary valve element 61 to which the shaft 52 is directly connected. Gears 36 and 51 are identical. Thus, since gear 36 rotates with the pointer, the rotary speed selector valve also rotates with the pointer. Naturally, the gear link causes a reverse motion between the two, but they maintain relative positions as they rotate. A stationary dial 53 is provided for the pointer, indicating the positions of the selector valve.

The rotary selector valve distributes and relieves the oil pressure in the correct shifting cylinders to shift the gear clusters in the transmission into the speed corresponding to the positions indicated on the dial. This description discloses only one such position since the construction of these rotary valves is well understood in the art. The rotary valve is journalled in a casing 54 and includes two longitudinal passages, an exhaust passage 55 open at all times through a line 56 to the sump, and a pressure passage 57 open at all times to the pressure line 49 of the circuit.

The line 49 is in communication constantly with an annular groove 60 in the periphery of the rotary valve element 61. A port 62 extends radially from this groove into the passage 57. Another port 63 extends radially from this passage 57 and is adapted to register with a port 64 into which line 65 is connected. This line 65 extends to the cylinder 14 of the shifting unit.

Another port (not shown) extends from the passage 57 for registry with a port 66 into which the pipe 67 is connected leading to cylinder 13 of the shifting unit. Each of these pipes 65, 67 will register with respective exhaust ports one of which is shown at 68. As shown, exhaust of cylinder 13 is taking place through port 68.

*Operation*

With the clutch lever 21 in either forward or reverse position, the shut-off valve 6 is closed and the pressure to the shifting valve 7 is relieved. The operator may now select the speed for his next operation by setting the pointer 37. After he has selected the next speed, he can stop, reverse or continue on at the same speed for a number of operations without disturbing or affecting the pre-selection, even though the clutch lever 21 is moved into neutral many times during this period.

To effect a change, the selector handle 32 must be pushed in while the clutch lever is in neutral. The selector handle is foolproof. If the operator should, by chance, push the selector handle in while the clutch lever is in either forward or reverse position, the coil spring behind the plunger 34 would move the plunger out again.

As an example, let us say that the selector mechanism is set to run at speed A. The forward clutch is engaged, the shut-off valve is closed, and the selector valve 8 is still set to align the necessary ports to effect the shift resulting in speed A. The gear cluster at this time is being held in its respective position by the detent 12. While the machine is running at speed A, the operator may set the selector mechanism by turning the selector handle 32 for speed B. The only change in the circuit takes place in the selector valve 8. Here, the ports necessary to effect speed B and the ports necessary to disengage the gears of speed A are aligned. If the operator desires to continue at speed A for several operations, he may do so as long as he does not push in the selector handle while the clutch control handle is in neutral.

Now, when the operator wants to change to the preselected speed B, he throws the clutch control lever into neutral. This opens the shut-off valve 6, directing oil pressure through line 28 to the shifting valve 7. He then pushes in the selector handle to direct the oil pressure through the shifting valve to the selector valve. The selector handle remains in, due to the oil pressure on the differential plunger 34. The oil pressure is directed to the shifting cylinders through the line 49 to the selector valve 8, which had been previously set for speed B. As soon as the clutch lever is moved out of neutral, the pressure on the selector valve is relieved and the spring 44 returns the selector valve to out position.

Having described my invention I claim:

1. A fluid operated gear shifting mechanism, comprising a selector valve, lever means for rotating said selector valve to indicated positions for appropriate speed changes, a gear shifting control plunger actuated by said lever means, said lever including mounting means enabling the lever to impart axial movement to the plunger, a source of fluid pressure delivering the fluid to said plunger and said selector valve, a shut-off valve interposed between the source of fluid pressure and the selector valve, a clutch lever controlling the power to the transmission and adapted to open said shut-off valve when in neutral position, and a fluid connection from said source of power to said plunger, controlled by said shut-off valve, and said plunger having unbalanced areas affected by said fluid pressure whereby said plunger is held in gear shifting position when the shut-off valve is open.

2. A fluid operated gear shifting mechanism including gears to be coupled, a gear shifting device, a selector valve, a shifter valve, a control lever for controlling the power for driving said gears, a source of fluid pressure, a shut-off valve actuated by said control lever, a fluid line extending from the source of pressure through the shut-off valve to the shifter valve, the selector valve and the shifting device, said selector valve having an operating lever and indicator means therefor, with said selector valve lever being mounted for operating said shifter valve, fluid operated means in the shifter valve for holding said valve in open or shifting position when the shut-off valve is open with the control lever in neutral and a spring for normally returning said shifter valve to closed position.

3. A fluid operated gear shifting mechanism including, a shifting valve, means for supplying fluid under pressure to said shifting valve, said valve including a rotatable element and an axially slidable plunger having unbalanced areas and mounted in the rotatable element, a lever connected to the rotatable element for rotation thereof and engageable with the plunger for translation thereof, an indicator means carried by said rotatable element, a selector valve having a transmission connection to said rotatable element and a fluid connection to said shifting valve, gear shifting elements supplied from said selector valve whereby said selector valve may be set to an appropriate speed by rotation of said rotatable element of said shifter valve and the shift may be accomplished by translation of said plunger of said shifter valve, a lever for controlling power for driving gears of said transmission, and a shut-off valve interposed between said shifting valve and means for supplying pressure thereto, said shut-off valve being interconnected with said power controlling lever in opened position when the lever is in neutral position, the interconnection being arranged to close said valve when said lever is shifted from neutral whereby fluid is admitted to the shifting valve to hold the plunger thereof in a shifting position by exerting unbalanced pressure on the said unbalanced areas of said plunger after the plunger is moved initially through the first named lever for translating it.

4. A fluid operated gear shifting mechanism, comprising a shut-off valve, a shifter valve, a selector valve, means for delivering fluid under pressure through said valves in the order named, a control lever for opening and closing said shut-off valve, and a lever having a compound motion for operating said selector valve in one motion and said shifter valve in another motion; whereby, when said shut-off valve is closed, said selector valve may be reset without flow of fluid to the selector valve until the control lever is operated to open the shut-off valve and the second lever is operated to open the shifter valve for the selected shift, and said shifter valve having unbalanced areas therein whereby it is maintained in a position to which it has been moved through said lever having compound motion until said shut-off valve is closed.

5. A fluid operated gear shifting mechanism, comprising a shut-off valve, a shifter valve, a selector valve, a fluid operating gear shifting unit, means for delivering fluid under pressure through said valves to said unit in the order named, a control lever controlling the power to the gears to be shifted and adapted to open and close said shut-off valve, and a second lever having a compound motion for operating said selector valve in one motion and said shifter valve in another motion; whereby, when said shut-off valve is closed and although said selector valve is reset, the flow of fluid to the selector valve will not occur until the control lever is operated to open the shut-off valve and the second lever is operated to open the shifter valve, said shifter valve comprising a spring return plunger having unbalanced areas therein subject to pressure admitted from said shut-off valve when said plunger is in a gear shifting position whereby said valve is maintained in said position against the pressure of said spring until said pressure is relieved through closure of said shut-off valve.

6. A fluid operated gear shifting mechanism, comprising a selector valve, shifting means for moving said selector valve to selected positions for appropriate speed changes, a gear shift control plunger actuated by said shifting means for controlling the flow of shifting fluid to said selector valve, a source of fluid pressure, a shut-off valve interposed between the source of fluid pressure and said shifting plunger, a lever adapted to open said shut-off valve when said lever is in neutral position, said lever adapted to control the drive to the transmission, the gears of which are to be shifted, and a fluid connection to said plunger, controlled by said shut-off valve, with said plunger having unbalanced areas subjected to the pressure of fluid from said connection, for holding the plunger in gear shifting position when the shut-off valve is open.

7. A fluid operated gear shifting mechanism including gears to be coupled, gear coupling means, a selector valve, a shifter valve, means for controlling the power connection to the gears, a source of fluid pressure, a shut-off valve actuated by the power control means, a fluid line extending from the source of pressure through the shut-off valve to the shifter valve, the selector valve and the gear coupling means, a manually operated shifter valve operating means, said shifter valve including surfaces normally exposed to the fluid pressure when the shifter valve is closed or not in shifting position and the shut-off valve is opened, which surfaces are of equal areas whereby the shifter valve will not be moved by the hydraulic pressure and said shifter valve including other surfaces exposed to the fluid pressure when the shifter valve is in shifting position, which surfaces are of unequal areas, and whereby the fluid pressure effective upon the surfaces of unequal areas will hold the shifter valve in gear shifting position when manual pressure on the shifter valve has been relieved.

WILLIAM G. HOELSCHER.